US009200969B2

United States Patent
Ueno

(10) Patent No.: US 9,200,969 B2
(45) Date of Patent: Dec. 1, 2015

(54) FORCE SENSOR

(75) Inventor: Masamichi Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/112,131

(22) PCT Filed: Apr. 19, 2012

(86) PCT No.: PCT/JP2012/061160
§ 371 (c)(1),
(2), (4) Date: Oct. 16, 2013

(87) PCT Pub. No.: WO2012/153643
PCT Pub. Date: Nov. 15, 2012

(65) Prior Publication Data
US 2014/0041461 A1 Feb. 13, 2014

(30) Foreign Application Priority Data

May 10, 2011 (JP) .................................. 2011-104962

(51) Int. Cl.
*G01L 1/10* (2006.01)
*G01L 1/04* (2006.01)
(Continued)

(52) U.S. Cl.
CPC ...... *G01L 1/04* (2013.01); *G01L 1/12* (2013.01); *G01L 1/125* (2013.01); *G01L 5/16* (2013.01); *G01L 5/164* (2013.01)

(58) Field of Classification Search
CPC .......... G01L 1/125; G01L 1/18; G01L 1/2231; G01L 5/164; G01P 15/123; F16C 19/522
USPC ........................ 73/862.625, 862.041–862.046
See application file for complete search history.

(56) References Cited

U.S. PATENT DOCUMENTS 3,824,674 A * 7/1974 Inoyama et al. ............ 29/407.05
4,573,362 A * 3/1986 Amlani ..................... 73/862.045
(Continued)

FOREIGN PATENT DOCUMENTS

JP 62-187230 A 8/1987
JP 01-119731 A 5/1989
(Continued)

OTHER PUBLICATIONS

Notification Concerning Transmittal of Translation of the International Preliminary Report on Patentability and the Written Opinion of the International Searching Authority dated Nov. 21, 2013, in related PCT International Application No. PCT/JP2012/061160.
(Continued)

*Primary Examiner* — Max Noori
(74) *Attorney, Agent, or Firm* — Fitzpatrick, Cella, Harper & Scinto

(57) ABSTRACT

A force sensor includes a pedestal member, an action member, a displacement detecting unit, a ridged member, at least three columnar elastic members, and elastic units. The action member is configured to be displaced by an exerted external force, and the displacement detecting unit detects a displacement of the action member. The rigid member is arranged so as to face the pedestal member. The columnar elastic members extend in a direction perpendicular to the pedestal member, are arranged about an axis at intervals, and connect the pedestal member and the rigid member. The elastic units are arranged about the axis at intervals and connect the action member and the rigid member. The elastic units each include a pair of beam-shaped elastic members extending in a direction parallel to a plane of the pedestal member.

3 Claims, 7 Drawing Sheets

(51) Int. Cl.
*G01L 1/12* (2006.01)
*G01L 5/16* (2006.01)

(56) References Cited

U.S. PATENT DOCUMENTS

| | | | |
|---|---|---|---|
| 4,695,963 A * | 9/1987 | Sagisawa et al. | 700/258 |
| 4,849,730 A | 7/1989 | Izumi et al. | |
| 4,951,510 A * | 8/1990 | Holm-Kennedy et al. | 73/862.041 |
| 5,526,700 A * | 6/1996 | Akeel | 73/862.043 |
| 5,571,972 A * | 11/1996 | Okada | 73/862.043 |
| 6,619,102 B2 * | 9/2003 | Salou et al. | 73/11.07 |
| 8,453,523 B2 | 6/2013 | Sato | |
| 2010/0175487 A1 | 7/2010 | Sato | |

FOREIGN PATENT DOCUMENTS

| | | |
|---|---|---|
| JP | H01-262431 A | 10/1989 |
| JP | 2009-075083 A | 4/2009 |
| KR | 20100056534 A | 5/2010 |

OTHER PUBLICATIONS

G. Hirzinger and J. Dietrich, Multi-Sensor-System Fur Roboter, Technisches Messen TM, R. Oldenbourg Verlag, Munchen, DE, vol. 53, No. 7/08, Jan. 1, 1986, pp. 286-292 (XP000003877).

Office Action in Japanese Patent Application No. 2011-104962 mailed Feb. 3, 2015.

Office Action in Korean Patent Application No. 10-2013-7032411 mailed Oct. 15, 2014.

* cited by examiner

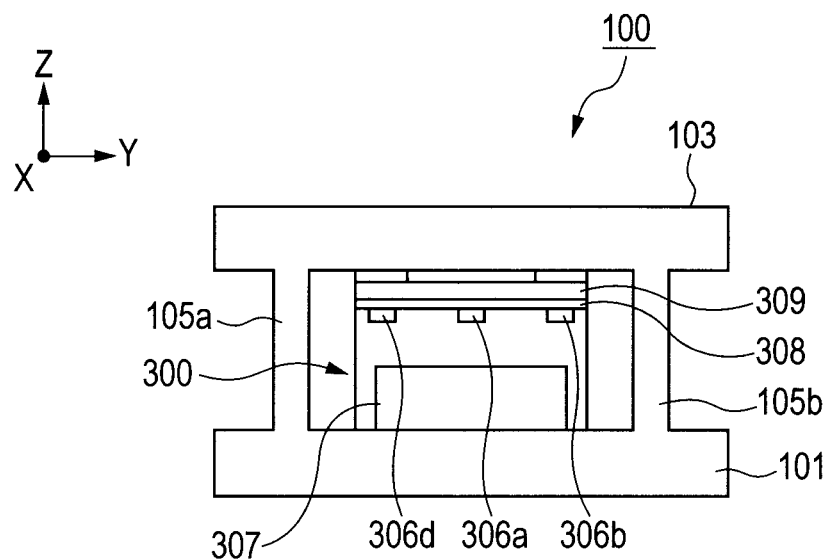
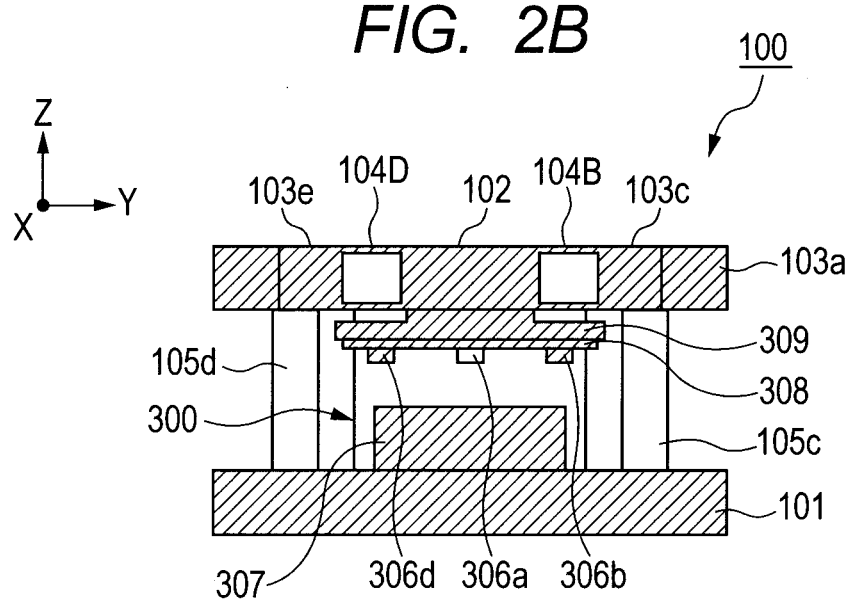

FORCE SENSOR

TECHNICAL FIELD

The present invention relates to a six-axis force sensor for detecting forces Fx, Fy, and Fz in respective directions of translation along mutually orthogonal X-, Y-, and Z-axes and moments Mx, My, and Mz in respective directions of rotation about the axes in a three-dimensional coordinate space defined by the axes.

BACKGROUND ART

A six-axis force sensor is used in, for example, an assembling robot which assembles a part. The six-axis force sensor is attached to a wrist of an arm of the robot and is used to detect a force and a moment component generated during assembly work and perform posture control of a hand portion. The force sensor includes a pedestal member which is fixed to, e.g., the robot arm and an action member which is fixed to, e.g., the hand portion and is displaced relative to the pedestal member according to an external force. The pedestal member and action member are connected by an elastic body.

A force or a moment exerted on the action member is detected as a displacement of the action member by a displacement detecting unit. Displacement detecting units of this type include one which detects a displacement of an action member from a change in the resistance of a strain gauge resulting from a strain in an elastic body caused by a force applied to the action member (see PTL 1). A magnetic displacement detecting unit has also been proposed which includes a magnetic flux generating source and a magneto-electric transducer (see PTL 2). Use of such a magnetic displacement detecting unit achieves higher durability than use of a strain gauge. Accordingly, application of a magnetic force sensor to an assembling robot improves reliability.

CITATION LIST

Patent Literature

PTL 1: Japanese Patent Application Laid-Open No. H01-262431
PTL 2: Japanese Patent Application Laid-Open No. 2009-75083

SUMMARY OF INVENTION

Technical Problem

Near work has recently been demanded from assembling robots. There is thus a need for a further improvement in the accuracy of detecting a force and a moment with a force sensor. A force sensor, however, suffers from the problem of interference from other axes (e.g., a phenomenon in which a moment component My is simultaneously generated when an external force is applied to an action member in an X-axis direction), which is especially notable in a magnetic force sensor. Accordingly, such a detection error caused by interference from other axes needs to be minimized in order to improve the accuracy of detecting a force and a moment.

Under the circumstances, an object of the present invention is to provide a force sensor which can reduce a detection error caused by mutual interference between axes and detect a target force and moment with high accuracy.

Solution to Problem

The present invention is a force sensor including: a planar pedestal member; an action member arranged so as to face the pedestal member which is displaced relative to the pedestal member by an exerted external force; a displacement detecting unit which detects a displacement of the action member relative to the pedestal member; a rigid member arranged so as to face the pedestal member; at least three columnar elastic members arranged at intervals about an axis in a direction perpendicular to the pedestal member and connecting the pedestal member and rigid member; and elastic units arranged about the axis at intervals and connecting the action member and rigid member, wherein each of the elastic units includes a beam-shaped elastic member extending in a horizontal direction relative to the pedestal member (i.e., a direction parallel to a plane of the pedestal member).

Advantageous Effects of Invention

According to the present invention, when an external force in a perpendicular direction perpendicular to the pedestal member is applied to the action member, since the columnar elastic members extend in the direction perpendicular to the pedestal member, the columnar elastic members are little flexed and act as rigid bodies. At this time, each beam-shaped elastic member is flexed in the direction perpendicular to the pedestal member, and the action member is displaced in the perpendicular direction. When an external force is applied to the pedestal member in the horizontal direction, since the beam-shaped elastic members extend in the horizontal direction, the beam-shaped elastic members are little flexed and act as rigid bodies. At this time, the columnar elastic members are flexed in the horizontal direction relative to the pedestal member, and the action member is displaced in the horizontal direction. Since an external force in the perpendicular direction to the pedestal member is applied to the action member even on the occurrence of a moment about an axis perpendicular to the pedestal member, the columnar elastic members are little flexed while the beam-shaped elastic members are flexed. Accordingly, a displacement about an axis horizontal to the pedestal member occurs in the action member. Similarly, since an external force in the horizontal direction to the pedestal member is applied to the action member even on the occurrence of a moment about the axis horizontal to the pedestal member, the beam-shaped elastic members are little flexed while the columnar elastic members are flexed. Accordingly, a displacement about the axis perpendicular to the pedestal member occurs in the action member. This reduces a detection error caused by mutual interference between axes and enables detection of a target force and moment with high accuracy.

Further features of the present invention will become apparent from the following description of exemplary embodiments with reference to the attached drawings.

BRIEF DESCRIPTION OF DRAWINGS

FIG. 2A is a front view of the force sensor according to the first embodiment of the present invention.

FIG. 2B is a cross-sectional view of the force sensor according to the first embodiment of the present invention.

DESCRIPTION OF EMBODIMENTS

Embodiments for carrying out the present invention will be described below in detail with reference to the drawings.

First Embodiment

Figure 1A:
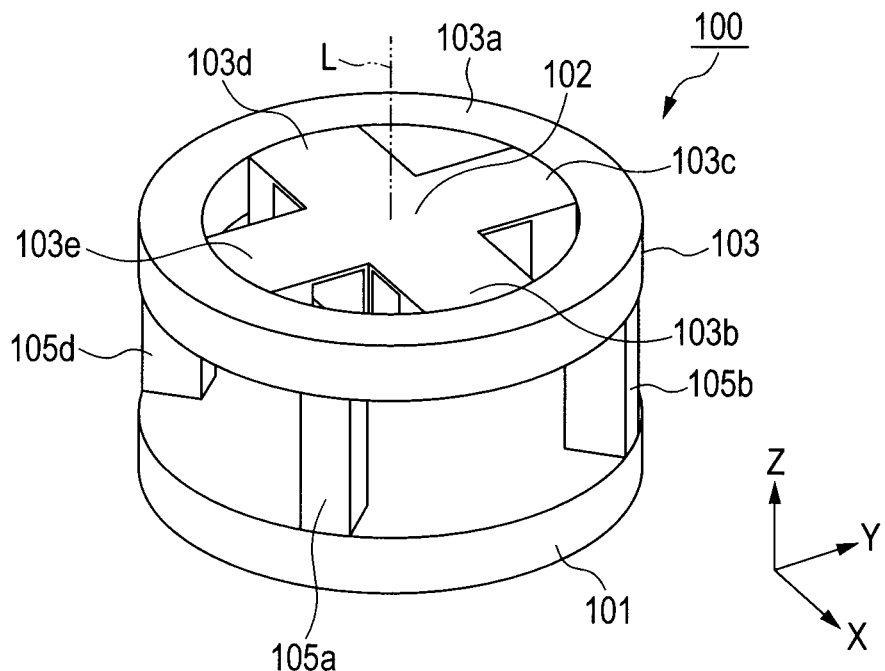
FIG. 1A is a perspective view of a force sensor according to a first embodiment of the present invention.
Figure 1B:
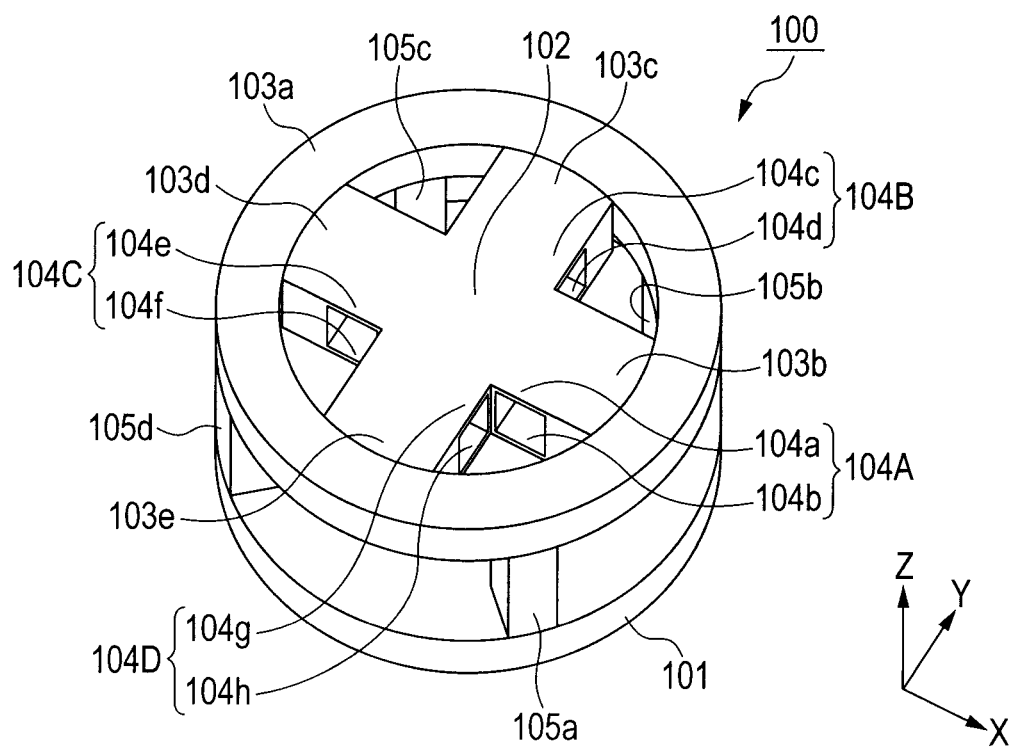
FIG. 1B is a perspective view of the force sensor according to the first embodiment of the present invention, as viewed in a direction different from the direction in FIG. 1A.

FIGS. 1A and 1B are views for describing the schematic configuration of a force sensor according to a first embodiment of the present invention. FIG. 1A is a perspective view of the force sensor, and FIG. 1B is a perspective view of the force sensor, as viewed in a direction different from the direction in FIG. 1A. The force sensor according to the present invention detects a detection value which is output in response to a displacement between a pedestal member and an action member caused by an external force applied to the force sensor and detects the force from the detection value. First, the mechanical configuration of a force sensor according to the present invention will be described below.

A force sensor 100 illustrated in FIGS. 1A and 1B is a six-axis force sensor which detects forces Fx, Fy, and Fz in respective directions of translation along X-, Y-, and Z-axes and moments Mx, My, and Mz in respective directions of rotation about the X-, Y-, and Z-axes. The force sensor 100 is arranged between a pair of objects to be measured (not illustrated). For example, one object to be measured of the pair of objects to be measured is a robot arm, and the other object to be measured is a hand portion. The hand portion is provided at a distal end of the robot arm via the force sensor 100.

The force sensor 100 includes a planar pedestal member 101 and a planar action member 102 which is arranged so as to face the pedestal member 101 and is displaced relative to the pedestal member 101 when an external force is exerted on the action member 102. The pedestal member 101 is fixed to one object to be measured while the action member 102 is fixed to the other object to be measured. The action member 102 without a displacement is parallel to the pedestal member 101. The pedestal member 101 and action member 102 are each made of a rigid body which is not easily deformed by an exerted external force. Although the pedestal member 101 is formed in a disc shape, the present invention is not limited to this. The pedestal member 101 may be a flat plate of any shape, such as a rectangular plate shape.

The force sensor 100 also includes a rigid member 103 which is arranged so as to face the pedestal member 101. The rigid member 103 includes a rigid base 103a which is formed in a ring shape (a circular ring shape in the first embodiment). The rigid base 103a is arranged at an arbitrary distance from the pedestal member 101 and is arranged in parallel so as to face the pedestal member 101. The rigid base 103a is set to have the same shape of the perimeter as the shape of the perimeter of the pedestal member 101. The action member 102 is arranged inside the rigid base 103a. The rigid member 103 also includes four rigid protruding pieces 103b, 103c, 103d, and 103e which are arranged at intervals about an axis L perpendicular to a plane of the pedestal member 101 and protrude inwardly from the rigid base 103a. In the first embodiment, the axis L is a line passing through the center of the pedestal member 101 and parallel to the Z-axis. In the first embodiment, the four rigid protruding pieces 103b, 103c, 103d, and 103e are arranged at equal intervals (intervals of 90°) about the axis L perpendicular to the plane of the pedestal member 101. The rigid member 103 and action member 102 may be integrally formed.

The rigid protruding pieces 103b to 103e are fixed to the rigid base 103a.

The force sensor 100 further includes four elastic units 104A, 104B, 104C, and 104D which connect the action member 102 and the rigid protruding pieces 103b to 103e of the rigid member 103. In the first embodiment, the four elastic units 104A, 104B, 104C, and 104D are arranged about the axis L at equal intervals (intervals of 90°).

The elastic units 104A to 104D each include at least one beam-shaped elastic member which extends in a horizontal direction that is horizontal to the pedestal member 101. In the first embodiment, the elastic unit includes a pair of beam-shaped elastic members. More specifically, the elastic unit 104A includes a pair of beam-shaped elastic members 104a and 104b. The elastic unit 104B includes a pair of beam-shaped elastic members 104c and 104d. The elastic unit 104C includes a pair of beam-shaped elastic members 104e and 104f. The elastic unit 104D includes a pair of beam-shaped elastic members 104g and 104h. One end of each beam-shaped elastic member is fixed to the action member 102 while the other end is fixed to the corresponding rigid protruding piece.

The beam-shaped elastic members 104a to 104h are each formed so as to have a thickness smaller than the thickness of the action member 102. That is, the beam-shaped elastic members 104a to 104h connecting the action member 102 and the rigid protruding pieces of the rigid member 103 are formed in the shape of a leaf spring and are flexurally deformable in a perpendicular direction perpendicular to the pedestal member 101.

The pair of beam-shaped elastic members of each of the elastic units 104A to 104D is arranged in a direction along the axis L. Note that the pair of beam-shaped elastic members may be arranged with an arbitrary interval and that the interval is set to be nearly equal to the thickness of the action member 102 in the first embodiment. In the present embodiment, the interval between beam-shaped elastic members 104a and 104b, the interval between beam-shaped elastic members 104c and 104d, the interval between beam-shaped elastic members 104e and 104f, and the interval between beam-shaped elastic members 104g and 104h are all equal.

In the first embodiment, formation of a through hole in each of rigid body pieces extending in four directions of a cross-shaped rigid body enables a configuration in which one pair of beam-shaped elastic members is formed integrally with the action member 102 and each of the rigid protruding pieces 103b to 103e. Note that although the through hole is formed in a square shape, as illustrated in FIGS. 1A and 1B, the through hole may be formed in a circular shape or rectangular shape.

The force sensor 100 further includes at least three (four in the first embodiment) columnar elastic members 105a, 105b, 105c, and 105d which extend in the direction perpendicular to the pedestal member 101 and connect the pedestal member 101 and the rigid base 103a of the rigid member 103. The four columnar elastic members 105a to 105d are arranged about the axis L at equal intervals (intervals of)90°. That is, the rigid base 103a may be supported on three or more points of the pedestal member 101 and is supported on four points in the first embodiment. The columnar elastic members 105a to 105d connecting the pedestal member 101 and rigid base 103a in this manner are flexurally deformable in the horizontal direction that is horizontal to the pedestal member 101.

The columnar elastic members 105a to 105d may be any columnar members, such as a circular column or polygonal column, and are rectangular columns in the first embodiment. The columnar elastic members 105a to 105d are arranged obliquely with respect to the X- and Y-axes in FIGS. 1A and 1B such that one surface of each of the columnar elastic members 105a to 105d faces toward the axis L. Note that the columnar elastic members 105a to 105d may each be a polygonal column whose one surface is parallel to the X- or Y-axis.

The pedestal member 101, action member 102, rigid member 103, elastic units 104A to 104D, and columnar elastic members 105a to 105d constitute a main body of the sensor.

A displacement detecting unit of a force sensor according to the present invention will now be described. FIGS. 2A and 2B are views for describing a displacement detecting unit of the force sensor according to the first embodiment of the present invention. FIG. 2A is a front view of the force sensor 100, and FIG. 2B is a cross-sectional view of the force sensor 100. The force sensor 100 includes a displacement detecting unit 300 which detects a displacement of the action member 102 relative to the pedestal member 101.

The displacement detecting unit 300 includes a magnetic flux generating source 307 which is provided at one member of the pedestal member 101 and the action member 102, the pedestal member 101 in the first embodiment. The displacement detecting unit 300 also includes magneto-electric transducers 306a to 306d which are provided at the other member, the action member 102 in the first embodiment, so as to face the magnetic flux generating source 307.

The magneto-electric transducers 306a to 306d are mounted on a circuit board 308 at predetermined intervals. The circuit board 308 is fixed to the action member 102 via a circuit board attaching member 309.

The magnetic flux generating source 307 is fixed to a surface of the pedestal member 101 which is opposite to a surface where the one object to be measured is fixed, i.e., an inner surface of the pedestal member 101. The circuit board 308 is fixed to a surface of the action member 102 which is opposite to a surface where the other object to be measured is fixed, i.e., an inner surface of the action member 102. The magnetic flux generating source 307 is arranged so as to face the magneto-electric transducers 306a to 306d.

Note that the magnetic flux generating source 307 and the magneto-electric transducers 306a to 306d may be reversely arranged. In this case, the magnetic flux generating source 307 is arranged at the action member 102 while the magneto-electric transducers 306a to 306d are arranged at the pedestal member 101.

Note that although a unit using magnetism has been illustrated as the displacement detecting unit 300, the displacement detecting unit 300 is not limited to this. For example, a displacement detecting unit using a change in electrical capacitance or an optical displacement detecting unit may be used.

Figure 3A:
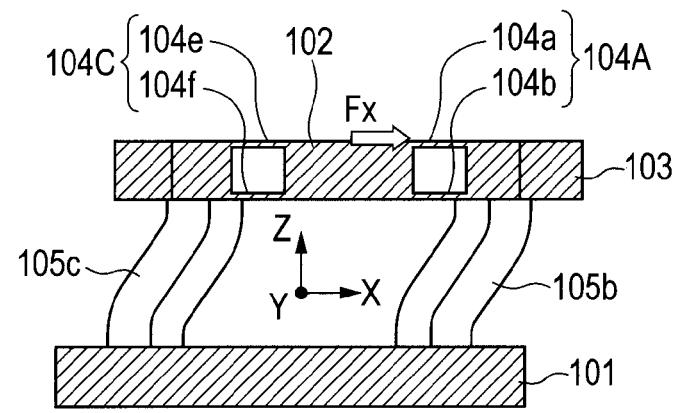
FIG. 3A is a cross-sectional view of a main body of the sensor illustrating a deformed state of the sensor main body when a force Fx is applied to an action member in an X-axis direction.
Figure 3B:
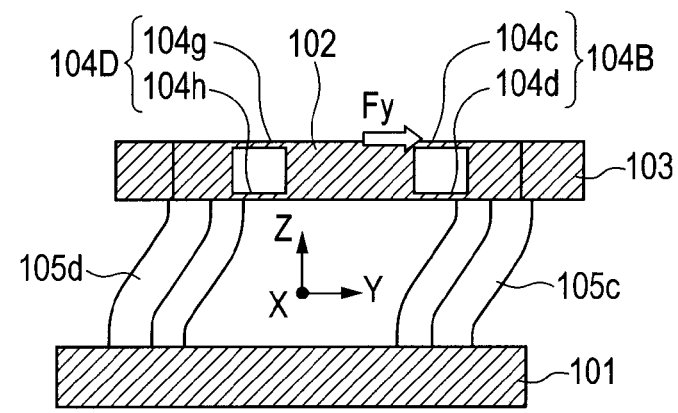
FIG. 3B is a cross-sectional view of the sensor main body illustrating a deformed state of the sensor main body when a force Fy is applied to the action member in a Y-axis direction.
Figure 3C:
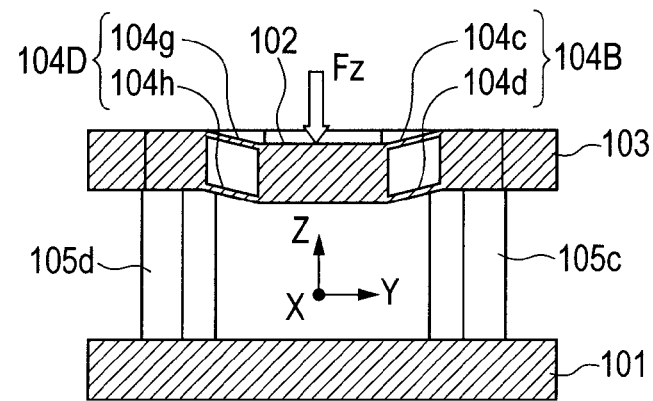
FIG. 3C is a cross-sectional view of the sensor main body illustrating a deformed state of the sensor main body when a force Fz is applied to the action member in a Z-axis direction.

The operation of the force sensor 100 will be described with reference to FIGS. 3A to 3C and 4A to 4C. Note that the displacement detecting unit 300 is not illustrated in FIGS. 3A to 3C and 4A to 4C. FIGS. 3A to 3C are views illustrating deformed states of the sensor main body when forces are applied to the action member 102 in respective directions of translation along the X-, Y-, and Z-axes. FIG. 3A is a cross-sectional view of the sensor main body illustrating a case where a force Fx is applied to the action member 102 in an X-axis direction, FIG. 3B is a cross-sectional view of the sensor main body illustrating a case where a force Fy is applied to the action member 102 in a Y-axis direction, and FIG. 3C is a cross-sectional view of the sensor main body illustrating a case where a force Fz is applied to the action member 102 in a Z-axis direction.

Figure 4A:
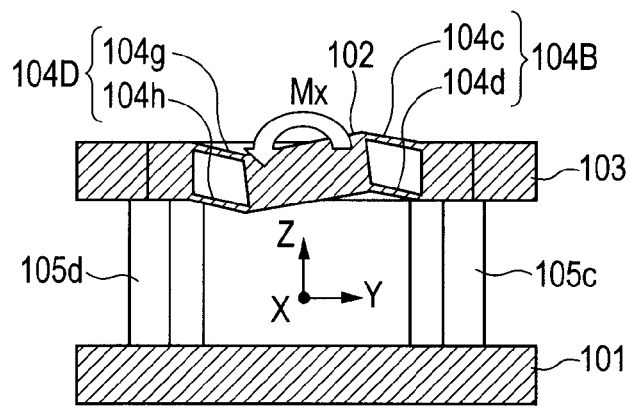
FIG. 4A is a cross-sectional view of the sensor main body illustrating a deformed state of the sensor main body when a moment Mx is applied to the action member about the X-axis.
Figure 4B:
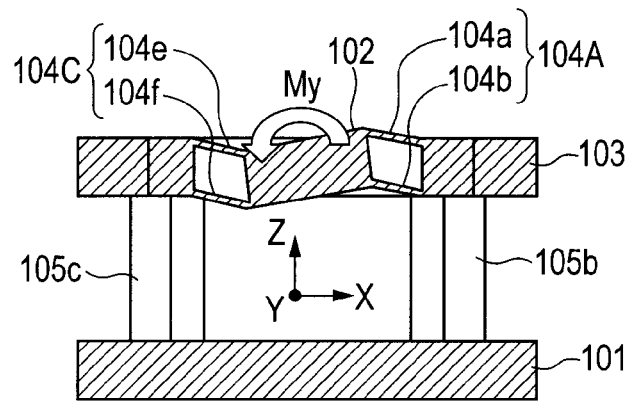
FIG. 4B is a cross-sectional view of the sensor main body illustrating a deformed state of the sensor main body when a moment My is applied to the action member about the Y-axis.
Figure 4C:
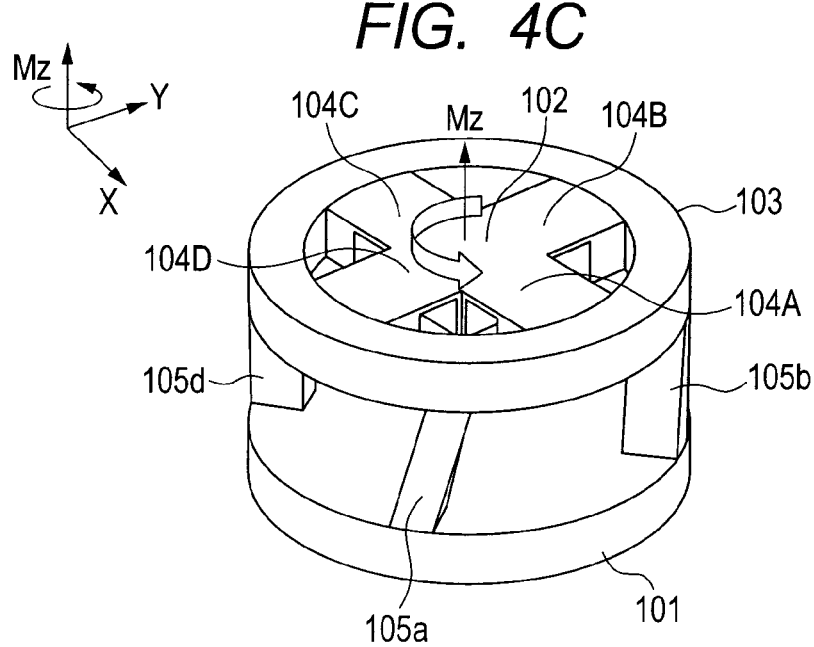
FIG. 4C is a perspective view of the sensor main body illustrating a deformed state of the sensor main body when a moment Mz is applied to the action member about the Z-axis.

FIGS. 4A to 4C are views illustrating deformed states of the sensor main body when moments are applied to the action member 102 in respective directions of rotation about the X-, Y-, and Z-axes. FIG. 4A is a cross-sectional view of the sensor main body illustrating a case where a moment Mx is applied to the action member 102 about the X-axis, and FIG. 4B is a cross-sectional view of the sensor main body illustrating a case where a moment My is applied to the action member 102 about the Y-axis. FIG. 4C is a perspective view of the sensor main body illustrating a case where a moment Mz is applied to the action member 102 about the Z-axis.

When the force Fx is applied to the action member 102 in the horizontal direction (X-axis direction) relative to the pedestal member 101, as illustrated in FIG. 3A, the beam-shaped elastic members 104a to 104h of the elastic units 104A to 104D are little flexed by the force in the horizontal direction and act as rigid bodies. In contrast, the columnar elastic members 105a to 105d are flexed in the horizontal direction (X-axis direction). Accordingly, the action member 102 is displaced in the horizontal direction together with the elastic units 104A to 104D and rigid member 103. Similarly, when the force Fy is applied to the action member 102 in the horizontal direction (Y-axis direction) to the pedestal member 101, as illustrated in FIG. 3B, the beam-shaped elastic members 104a to 104h of the elastic units 104A to 104D are little flexed by the force in the horizontal direction and act as rigid bodies. In contrast, the columnar elastic members 105a to 105d are flexed in the horizontal direction (Y-axis direction). Accordingly, the action member 102 is displaced in the horizontal direction together with the elastic units 104A to 104D and rigid member 103.

When the force Fz is applied to the action member 102 in the perpendicular direction (Z-axis direction) relative to the pedestal member 101, as illustrated in FIG. 3C, the columnar elastic members 105a to 105d are little flexed by the force Fz in the Z-axis direction and act as rigid bodies. In contrast, the beam-shaped elastic members 104a to 104h are flexed in the Z-axis direction, and the action member 102 is displaced in the Z-axis direction. The columnar elastic members, of course, need not be completely perpendicular to planar portions of the planar pedestal member 101 where the columnar elastic members are provided. Each columnar elastic member may be tilted at several degrees as long as the columnar elastic member is little flexed by the force Fz in the Z-axis direction and can be expected to have the effect of acting as a rigid body.

When the moment Mx is applied to the action member 102 about the X-axis, as illustrated in FIG. 4A, the columnar elastic members 105a to 105d are little flexed. In contrast, the beam-shaped elastic members 104a to 104h are flexed. This results in a displacement of the action member 102 about the X-axis. Similarly, when the moment My is applied to the action member 102 about the Y-axis, as illustrated in FIG. 4B, the columnar elastic members 105a to 105d are little flexed. In contrast, the beam-shaped elastic members 104a to 104h are flexed. This results in a displacement of the action member 102 about the Y-axis.

When the moment Mz is applied to the action member 102 about the Z-axis, as illustrated in FIG. 4C, the beam-shaped elastic members 104a to 104h are little flexed, and the columnar elastic members 105a to 105d are flexed. The flexural deformations of the columnar elastic members 105a to 105d result in a displacement of the action member 102 about the Z-axis.

Accordingly, a detection error caused by mutual interference between the forces Fx, Fy, and Fz in the directions of translation along the X-, Y-, and Z-axes and the moments Mx, My, and Mz in the directions of rotation about the axes in a three-dimensional coordinate space defined by the axes can be reduced.

The displacements of the action member 102 are detected by the displacement detecting unit 300 (see FIG. 2). More specifically, on the occurrence of the forces Fx, Fy, and Fz in the directions of translation along the X-, Y-, and Z-axes and the moments Mx, My, and Mz in the directions of rotation about the axes in the three-dimensional coordinate space defined by the axes, the displacements illustrated in FIGS. 3A to 3C and 4A to 4C are given to the magneto-electric transducers 306a to 306d. Accordingly, the amounts of relative displacement between the magnetic flux generating source 307 provided at the pedestal member 101 and the magneto-electric transducers 306a to 306d provided at the action member 102 are detected as changes in the magnetic flux densities in the magneto-electric transducers 306a to 306d. The amounts of electric displacement proportional to the amounts of relative displacement between the magnetic flux generating source 307 and the magneto-electric transducers 306a to 306d are obtained from the magneto-electric transducers 306a to 306d. As described above, the amounts of displacement of the action member 102 corresponding to the forces Fx, Fy, and Fz and the moments Mx, My, and Mz are detected by the displacement detecting unit 300. Since the displacement detecting unit 300 detects a displacement of the action member 102 with reduced interference from other axes, the displacement detecting unit 300 can detect a target force and moment with high accuracy.

In the first embodiment, the pair of beam-shaped elastic members 104a and 104b, the pair of beam-shaped elastic members 104c and 104d, the pair of beam-shaped elastic members 104e and 104f, and the pair of beam-shaped elastic members 104g and 104h are each arranged in parallel with a predetermined interval. The columnar elastic members 105a to 105d are rectangular columns. Accordingly, the amounts of displacement of the action member 102 when Fx, Fy, and Fz and Mx, My, and Mz are applied can be independently designed by designing, as parameters, the thicknesses of and the interval between each pair of beam-shaped elastic members and the lengths of two sides meeting at a right angle in a cross-section of each rectangular column along an X-Y plane.

Second Embodiment

Figure 5:
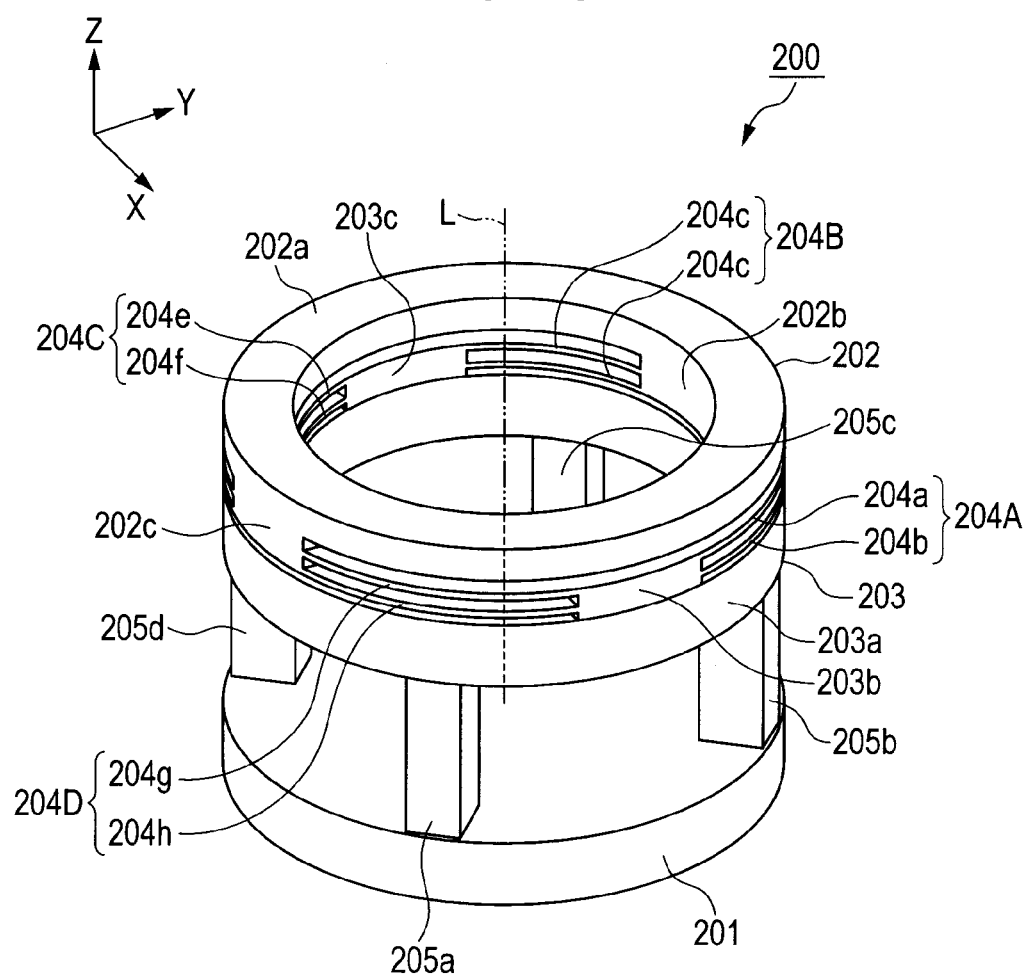
FIG. 5 is a perspective view illustrating the schematic configuration of a force sensor according to a second embodiment of the present invention.

A force sensor according to a second embodiment of the present invention will be described. FIG. 5 is a perspective view illustrating the schematic mechanical configuration of the force sensor according to the second embodiment of the present invention. A force sensor 200 illustrated in FIG. 5 is a six-axis force sensor which detects forces Fx, Fy, and Fz in respective directions of translation along X-, Y-, and Z-axes and moments Mx, My, and Mz in respective directions of rotation about the X-, Y-, and Z-axes. The force sensor 200 is arranged between a pair of objects to be measured (not illustrated). For example, one object to be measured of the pair of objects to be measured is a robot arm, and the other object to be measured is a hand portion. The hand portion is provided at a distal end of the robot arm via the force sensor 200.

The force sensor 200 includes a planar pedestal member 201 and a action member 202. The pedestal member 201 is fixed to one object to be measured while the action member 202 is fixed to the other object to be measured. The pedestal member 201 and action member 202 are each made of a rigid body which is not easily deformed by an exerted external force. Although the pedestal member 201 is formed in a disc shape, the present invention is not limited to this. The pedestal member 201 may be a flat plate of any shape, such as a rectangular plate shape.

The action member 202 is arranged so as to face the pedestal member 201 and includes a planar action base 202a which is displaced relative to the pedestal member 201 when an external force is exerted on the action member 202. The action base 202a without a displacement is parallel to the pedestal member 201. The action base 202a is set to have the same shape of the perimeter as the shape of the perimeter of the pedestal member 201. In the second embodiment, the action base 202a is formed in a ring shape (a circular ring shape in the second embodiment).

The action member 202 also includes two protruding pieces 202b and 202c which are arranged about an axis L perpendicular to a plane of the pedestal member 201 and protrude from the action base 202a in a direction of the pedestal member 201 (toward the pedestal member). In the second embodiment, the axis L is a line passing through the center of the pedestal member 201 and parallel to the Z-axis. In the second embodiment, the two protruding pieces 202b and 202c are arranged at equal intervals (intervals of 180°) about the axis L perpendicular to the plane of the pedestal member 201.

The force sensor 200 also includes a rigid member 203 which is arranged so as to face the pedestal member 201. The rigid member 203 is arranged between the pedestal member 201 and the action base 202a and includes a rigid base 203a which is formed in a ring shape (a circular ring shape in the second embodiment). The rigid base 203a is arranged at an arbitrary distance from the pedestal member 201 and is arranged in parallel to the pedestal member 201. The rigid base 203a is set to have the same shape of the perimeter as the shape of the perimeter of the pedestal member 201.

The rigid member 203 further includes two rigid protruding pieces 203b and 203c which protrude from the rigid base 203a in a direction of the action base 202a (toward the action base) and are arranged about the axis L at intervals such that the rigid protruding pieces 203b and 203c alternate with the protruding pieces 202b and 202c. In the second embodiment, the two rigid protruding pieces 203b and 203c protrude from the rigid base 203a in the direction of the action base 202a (toward the action base) and are arranged about the axis L at equal intervals (intervals of 180°) such that the rigid protruding pieces 203b and 203c alternate with the protruding pieces 202b and 202c.

The rigid base 203a and rigid protruding pieces 203b and 203c are each made of a rigid body which is not deformed by an exerted external force. The rigid protruding pieces 203b and 203c are fixed to the rigid base 203a.

In this case, the action base 202a and the rigid protruding pieces 203b and 203c are at a predetermined distance from each other so as not to prevent a required displacement of the action base 202a. Similarly, the rigid base 203a and the protruding pieces 202b and 202c are at a predetermined distance from each other so as not to prevent a required displacement of the action base 202a.

The force sensor 200 further includes four elastic units 204A, 204B, 204C, and 204D which are arranged about the axis L at intervals and connect the protruding pieces 202b and 202c of the action member 202 and the rigid protruding pieces 203b and 203c of the rigid member 203. More specifically, the elastic unit 204A connects the protruding piece 202b and rigid protruding piece 203b, the elastic unit 204B connects the protruding piece 202b and rigid protruding piece 203c, and the elastic unit 204C connects the protruding piece 202c and rigid protruding piece 203c. The elastic unit 204D connects the protruding piece 202c and rigid protruding piece 203b. In the second embodiment, the four elastic units 204A, 204B, 204C, and 204D are arranged about the axis L at equal intervals (intervals of 90°).

The elastic units 204A to 204D each include at least one beam-shaped elastic member which extends in a horizontal direction horizontal to the pedestal member 201. In the second embodiment, the elastic unit includes a pair of beam-shaped elastic members. More specifically, the elastic unit 204A includes a pair of beam-shaped elastic members 204a and 204b. The elastic unit 204B includes a pair of beam-shaped elastic members 204c and 204d. The elastic unit 204C includes a pair of beam-shaped elastic members 204e and 204f. The elastic unit 204D includes a pair of beam-shaped elastic members 204g and 204h. The beam-shaped elastic members 204a to 204h of the elastic units 204A to 204D are arranged so as to extend in a circumferential direction along the action base 202a and rigid base 203a formed in a ring shape. One end of each beam-shaped elastic member is fixed to the corresponding protruding piece of the action member 202 while the other end is fixed to the corresponding rigid protruding piece of the rigid member 203.

The beam-shaped elastic members 204a to 204h are each formed so as to have a thickness smaller than the amounts by which the protruding pieces 202b and 202c of the action member 202 protrude and the amounts by which the rigid protruding pieces 203b and 203c of the rigid member 203 protrude. That is, the beam-shaped elastic members 204a to 204h connecting the protruding pieces 202b and 202c of the action member 202 and the rigid protruding pieces 203b and 203c of the rigid member 203 are each formed in the shape of a leaf spring and are flexurally deformable in a perpendicular direction perpendicular to the pedestal member 201.

The pair of beam-shaped elastic members of each of the elastic units 204A to 204D is arranged in a direction along the axis L. The interval between beam-shaped elastic members 204a and 204b, the interval between beam-shaped elastic members 204c and 204d, the interval between beam-shaped elastic members 204e and 204f, and the interval between beam-shaped elastic members 204g and 204h are all equal.

The force sensor 200 further includes at least three (four in the second embodiment) columnar elastic members 205a, 205b, 205c, and 205d which extend in the perpendicular direction to the pedestal member 201 and connect the pedestal member 201 and the rigid base 203a of the rigid member 203. The four columnar elastic members 205a to 205d are arranged about the axis L at intervals. In the second embodiment, the four columnar elastic members 205a to 205d are arranged about the axis L at equal intervals (intervals of 90°). That is, the rigid base 203a may be supported on three or more points of the pedestal member 201 and is supported on four points in the second embodiment. The columnar elastic members 205a to 205d connecting the pedestal member 201 and rigid base 203a in this manner are flexurally deformable in the horizontal direction horizontal to the pedestal member 201.

The columnar elastic members 205a to 205d may be any columnar members, such as a circular column or polygonal column, and are rectangular columns in the second embodiment. The columnar elastic members 205a to 205d are arranged obliquely with respect to the X- and Y-axes in FIG. 5 such that one surface of each of the columnar elastic members 205a to 205d faces toward the axis L. Note that the columnar elastic members 205a to 205d may each be a polygonal column whose one surface is parallel to the X- or Y-axis.

The pedestal member 201, action member 202, rigid member 203, elastic units 204A to 204D, and columnar elastic members 205a to 205d constitute a main body of the sensor.

The force sensor 200 includes a displacement detecting unit which is similar to the displacement detecting unit 300 according to the first embodiment (FIGS. 2A and 2B) and detects a displacement of the action base 202a relative to the pedestal member 201. The displacement detecting unit is not shown in FIG. 5.

Note that although the action base 202a and rigid base 203a are formed in a ring shape (a planar shape with a through hole) in the second embodiment, the present invention is not limited to the shape. The action base 202a and rigid base 203a may be formed in a planar shape without a through hole. In this case, the pedestal member 201 may be formed in a ring shape. If two or more sensor main bodies are provided, a through hole may not be formed.

Figure 6A:
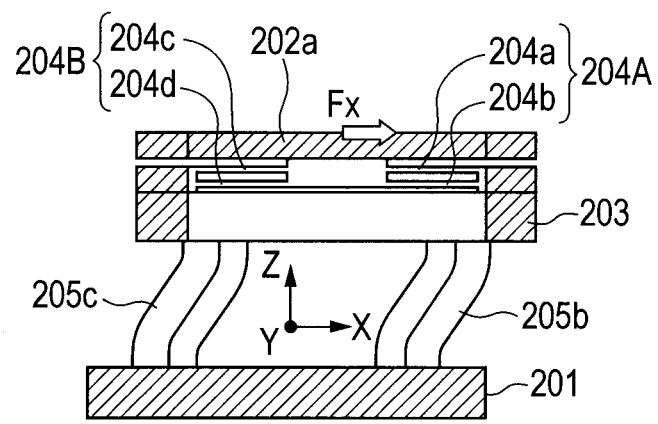
FIG. 6A is a cross-sectional view of a main body of the sensor illustrating a deformed state of the sensor main body when a force Fx is applied to an action base in an X-axis direction.
Figure 6B:
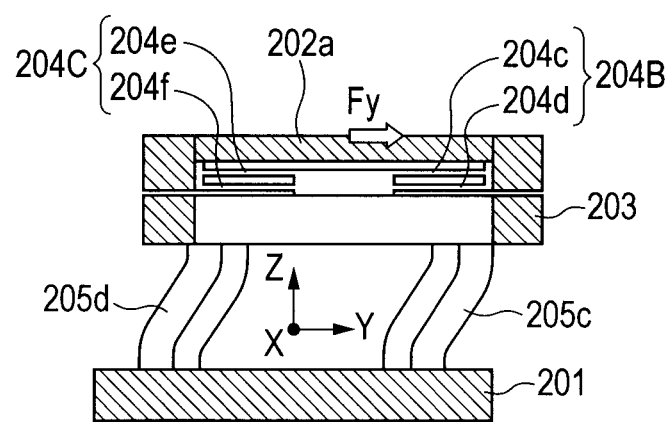
FIG. 6B is a cross-sectional view of the sensor main body illustrating a deformed state of the sensor main body when a force Fy is applied to the action base in a Y-axis direction.
Figure 6C:
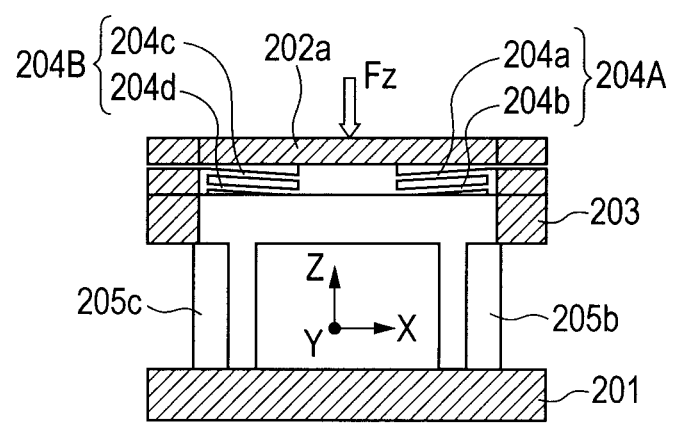
FIG. 6C is a cross-sectional view of the sensor main body illustrating a deformed state of the sensor main body when a force Fz is applied to the action base in a Z-axis direction.

The operation of the force sensor 200 will be described with reference to FIGS. 6A to 6C and 7A to 7C. Note that the displacement detecting unit is not illustrated in FIGS. 6A to 6C and 7A to 7C. FIGS. 6A to 6c are views illustrating deformed states of the sensor main body when forces are applied to the action base 202a in respective directions of translation along the X-, Y-, and Z-axes. FIG. 6A is a cross-sectional view of the sensor main body illustrating a case where a force Fx is applied to the action base 202a in an X-axis direction, FIG. 6B is a cross-sectional view of the sensor main body illustrating a case where a force Fy is applied to the action base 202a in a Y-axis direction, and FIG. 6C is a cross-sectional view of the sensor main body illustrating a case where a force Fz is applied to the action base 202a in a Z-axis direction.

Figure 7A:
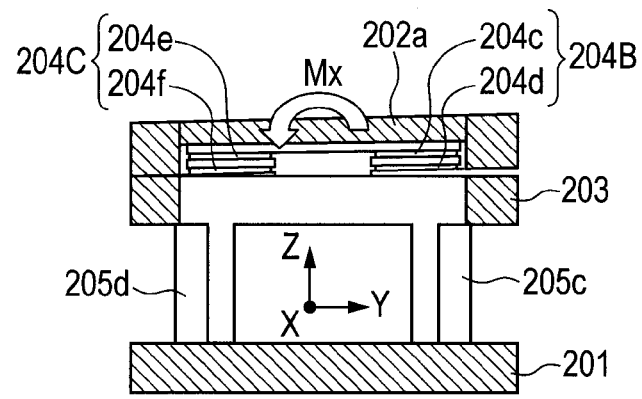
FIG. 7A is a cross-sectional view of the sensor main body illustrating a deformed state of the sensor main body when a moment Mx is applied to the action base about the X-axis.
Figure 7B:
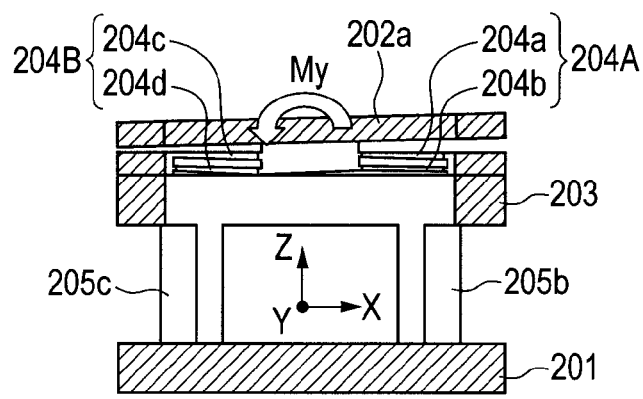
FIG. 7B is a cross-sectional view of the sensor main body illustrating a deformed state of the sensor main body when a moment My is applied to the action base about the Y-axis.
Figure 7C:
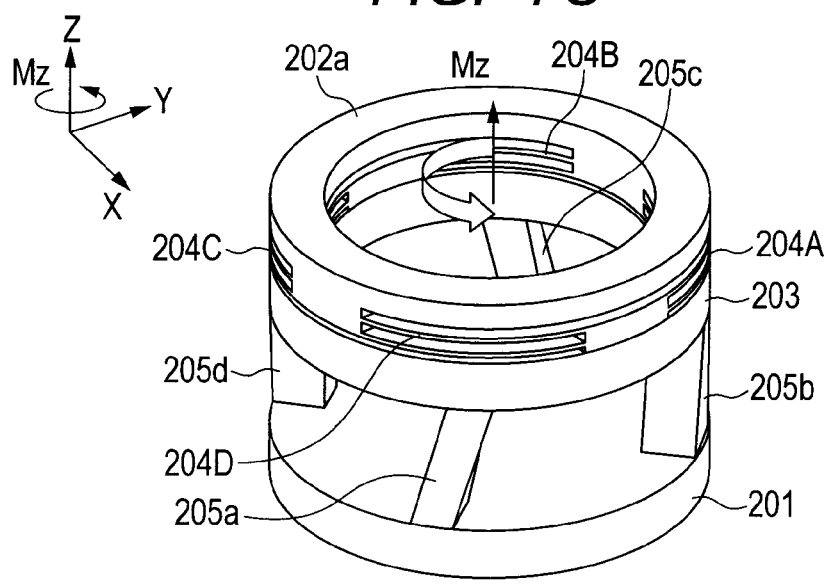
FIG. 7C is a perspective view of the sensor main body illustrating a deformed state of the sensor main body when a moment Mz is applied to the action base about the Z-axis.

FIGS. 7A to 7C are views illustrating deformed states of the sensor main body when moments are applied to the action base 202a in respective directions of rotation about the X-, Y-, and Z-axes. FIG. 7A is a cross-sectional view of the sensor main body illustrating a case where a moment Mx is applied to the action base 202a about the X-axis, and FIG. 7B is a cross-sectional view of the sensor main body illustrating a case where a moment My is applied to the action base 202a about the Y-axis. FIG. 7C is a perspective view of the sensor main body illustrating a case where a moment Mz is applied to the action base 202a about the Z-axis.

When the force Fx is applied to the action base 202a in the horizontal direction (X-axis direction) relative to the pedestal member 201, as illustrated in FIG. 6A, the beam-shaped elastic members 204a to 204h of the elastic units 204A to 204D are little flexed by the force in the horizontal direction and act as rigid bodies. In contrast, the columnar elastic members 205a to 205d are flexed in the horizontal direction (X-axis direction). Accordingly, the action member 202 is displaced in the horizontal direction together with the elastic units 204A to 204D and rigid member 203. Similarly, when the force Fy is applied to the action base 202a in the horizontal direction (Y-axis direction) relative to the pedestal member 201, as illustrated in FIG. 6B, the beam-shaped elastic members 204a to 204h of the elastic units 204A to 204D are little flexed by the force in the horizontal direction and act as rigid bodies. In contrast, the columnar elastic members 205a to 205d are flexed in the horizontal direction (Y-axis direction). Accordingly, the action member 202 is displaced in the horizontal direction together with the elastic units 204A to 204D and rigid member 203.

When the force Fz is applied to the action base 202a in the perpendicular direction (Z-axis direction) relative to the pedestal member 201, as illustrated in FIG. 6C, the columnar elastic members 205a to 205d are little flexed by the force Fz in the Z-axis direction and act as rigid bodies. In contrast, the beam-shaped elastic members 204a to 204h are flexed in the Z-axis direction, and the action member 202 is displaced in the Z-axis direction.

When the moment Mx is applied to the action base 202a about the X-axis, as illustrated in FIG. 7A, the columnar elastic members 205a to 205d are little flexed. In contrast, the beam-shaped elastic members 204a to 204h are flexed. This results in a displacement of the action member 202 about the X-axis. Similarly, when the moment My is applied to the action base 202a about the Y-axis, as illustrated in FIG. 7B, the columnar elastic members 205a to 205d are little flexed. In contrast, the beam-shaped elastic members 204a to 204h are flexed. This results in a displacement of the action member 202 about the Y-axis.

When the moment Mz is applied to the action base 202a about the Z-axis, as illustrated in FIG. 7C, the beam-shaped elastic members 204a to 204h are little flexed, and the columnar elastic members 205a to 205d are flexed. The flexural deformations of the columnar elastic members 205a to 205d result in a displacement of the action member 202 about the Z-axis.

Accordingly, a detection error caused by mutual interference between the forces Fx, Fy, and Fz in the directions of translation along the X-, Y-, and Z-axes and the moments Mx, My, and Mz in the directions of rotation about the axes in a three-dimensional coordinate space defined by the axes can be reduced. Since the displacement detecting unit detects a displacement of the action base 202a of the action member 202 with reduced interference from other axes, the displacement detecting unit can detect a target force and moment with high accuracy.

In the second embodiment, the pair of beam-shaped elastic members 204a and 204b, the pair of beam-shaped elastic members 204c and 204d, the pair of beam-shaped elastic members 204e and 204f, and the pair of beam-shaped elastic members 204g and 204h are each arranged in parallel with a predetermined interval. The columnar elastic members 205a to 205d are rectangular columns. Accordingly, the amounts of displacement of the action member 202 when Fx, Fy, and Fz and Mx, My, and Mz are applied can be independently designed by designing, as parameters, the thicknesses of and the interval between each pair of beam-shaped elastic members and the lengths of two sides meeting at a right angle in a cross-section of each rectangular column along an X-Y plane.

In the second embodiment, the action base 202a and rigid member 203a are formed in a ring shape, and the beam-shaped elastic members 204a to 204h are arranged along the action base 202a and rigid base 203a formed in a ring shape. Accordingly, a displacement detecting unit can be arranged at or near a portion which serves as the center of rotation of the action base 202a when the moments Mx and My are applied to the action base 202a, and a force and a moment can be detected with higher accuracy than the accuracy of the force sensor 100 according to the first embodiment.

Note that although the present invention has been described in the context of the above embodiments, the present invention is not limited to these embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104962, filed May 10, 2011, which is hereby incorporated by reference herein in its entirety.

Reference Signs List
100 force sensor
101 pedestal member
102 action member
103 rigid member
103a rigid base
103b to 103e rigid protruding piece
104A to 104D elastic unit
104a to 104h beam-shaped elastic member
105a to 105d columnar elastic member
200 force sensor
201 pedestal member
202 action member
202a action base
202b, 202c protruding piece
203 rigid member
203a rigid base
203b, 203c rigid protruding piece
204A to 204D elastic unit
204a to 204h beam-shaped elastic member
205a to 205d columnar elastic member
300 displacement detecting unit

The invention claimed is:

1. A force sensor comprising:
a planar pedestal member having an axis perpendicular to a plane of said planar pedestal member;
an action member arranged so as to face said pedestal member, said action member configured to be displaced relative to said pedestal member by an exerted external force;
a displacement detecting unit configured to detect a displacement of said action member relative to said pedestal member;
a rigid member arranged so as to face said pedestal member;
at least three columnar elastic members arranged at intervals about the axis and extending in a direction perpendicular to said pedestal member, said at least three columnar elastic members connecting said pedestal member and said rigid member; and elastic units arranged around the axis at intervals and connecting said action member and said rigid member, wherein each of said elastic units includes a pair of beam-shaped elastic members extending in a direction parallel to the plane of said pedestal member, and each of the pairs of beam-shaped elastic members com rises two leaf springs.

2. The force sensor according to claim 1, wherein said displacement detecting unit comprises at least one magneto-electric transducer and at least one magnetic flux generating source.

3. A force sensor comprising:
- a planar pedestal member having an axis perpendicular to a plane of said planar pedestal member;
- a ring-shaped action member arranged so as to face said pedestal member, said ring-shaped action member being configured to be displaced relative to said pedestal member by an exerted external force;
- a displacement detecting unit configured to detect a displacement of said ring-shaped action member relative to said pedestal member;
- at least two protruding pieces arranged at intervals about the axis and extending in a direction perpendicular to said pedestal member, said at least two protruding pieces protruding from said ring-shaped action member in a direction toward said pedestal member;
- a rigid base arranged between said pedestal member and said ring-shaped action member;
- at least two rigid protruding pieces protruding from said rigid base in a direction toward said ring-shaped action member and arranged about the axis at intervals such that said rigid protruding pieces alternate with said protruding pieces;
- at least three columnar elastic members arranged about the axis at intervals and connecting said pedestal member and said rigid base; and
- elastic units connecting said protruding pieces and said rigid protruding pieces,
- wherein each of said elastic units includes a beam-shaped elastic member extending in a direction parallel to the plane of said pedestal member.

* * * * *